United States Patent
Chen et al.

(10) Patent No.: US 12,085,948 B2
(45) Date of Patent: Sep. 10, 2024

(54) AUTOMATIC GENERATION METHOD FOR ROBOT RETURN-TO-BASE CODE

(71) Applicant: AMICRO SEMICONDUCTOR CO.,LTD., Guangdong (CN)

(72) Inventors: Zhuobiao Chen, Guangdong (CN); Hewen Zhou, Guangdong (CN); Huibao Huang, Guangdong (CN)

(73) Assignee: AMICRO SEMICONDUCTOR CO., LTD., Guangdong (CN)

(*) Notice: Subject to any disclaimer, the term of this patent is extended or adjusted under 35 U.S.C. 154(b) by 371 days.

(21) Appl. No.: 17/442,635

(22) PCT Filed: Nov. 1, 2019

(86) PCT No.: PCT/CN2019/114940
§ 371 (c)(1),
(2) Date: Sep. 24, 2021

(87) PCT Pub. No.: WO2020/199580
PCT Pub. Date: Oct. 8, 2020

(65) Prior Publication Data
US 2022/0187839 A1    Jun. 16, 2022

(30) Foreign Application Priority Data
Apr. 1, 2019    (CN) .......................... 201910255044.1

(51) Int. Cl.
*G05D 1/00*    (2024.01)
(52) U.S. Cl.
CPC .................................. *G05D 1/0225* (2013.01)

(58) Field of Classification Search
CPC .. G05D 1/0225; G05D 1/0219; G05D 1/0242; G05D 2201/0203; G05D 1/0212;
(Continued)

(56) References Cited

U.S. PATENT DOCUMENTS

| 4,672,280 A | 6/1987 | Honjo |
| 9,939,814 B1 | 4/2018 | Bauer et al. |

(Continued)

FOREIGN PATENT DOCUMENTS

| CN | 1876336 A | 12/2006 |
| CN | 102983454 A | 3/2013 |

(Continued)

*Primary Examiner* — Abby Y Lin
*Assistant Examiner* — Esvinder Singh
(74) *Attorney, Agent, or Firm* — Samson G. Yu (57) ABSTRACT

An automatic generation method for a robot return-to-base code includes the following steps that: on the basis of a preset signal collection mode, a robot collects a guide signal which is sent by a charging base and distributed within a preset range (S1); the robot transmits signal information and position information of the robot recorded when the guide signal is collected to a data processing device (S2); and the data processing device generates a robot return-to-base code corresponding to the charging base according to the received signal information and position information (S3). By means of the information collected by the robot in different modes, the data processing device automatically generates, according to the information, the robot return-to-base code corresponding to the charging base, so that research and development personnel do not need to delve into a robot return-to-base algorithm or write a specific return-to-base code.

9 Claims, 4 Drawing Sheets

S1 — On the basis of a preset signal collection mode, a robot collects a guide signal which is sent by a charging base and distributed within a preset range S2 — The robot transmits signal information and position information of the robot recorded when the guide signal is collected to a data processing device S3 — The data processing device generates a robot return-to-base code corresponding to the charging base according to the received signal information and position information (58) Field of Classification Search
CPC ... B25J 5/007; B25J 9/162; B25J 9/163; B25J 9/1664; B25J 11/0085; A47L 9/2873; A47L 2201/02; A47L 2201/022; A47L 9/2868; G05B 2219/31004

See application file for complete search history.

(56) References Cited

U.S. PATENT DOCUMENTS

| | | | |
|---|---|---|---|
| 11,328,614 B1* | 5/2022 | Bart | G05D 1/12 |
| 2006/0087273 A1* | 4/2006 | Ko | A47L 9/2805 |
| | | | 318/587 |
| 2014/0336863 A1* | 11/2014 | So | A47L 9/2815 |
| | | | 701/28 |
| 2016/0229060 A1* | 8/2016 | Kim | B60L 53/60 |
| 2017/0314892 A1 | 11/2017 | Holder | |
| 2018/0249872 A1* | 9/2018 | Park | A47L 11/28 |
| 2019/0011413 A1* | 1/2019 | Caussy | G01N 33/0075 |
| 2019/0146513 A1* | 5/2019 | Tomita | G05D 1/0088 |
| | | | 701/50 |
| 2020/0150676 A1* | 5/2020 | Huang | G05D 1/0236 |
| 2021/0096574 A1* | 4/2021 | Lee | G05D 1/0219 |
| 2021/0165421 A1* | 6/2021 | Ko | G05D 1/0259 |
| 2021/0276441 A1* | 9/2021 | Ben-David | B60L 53/36 |

FOREIGN PATENT DOCUMENTS

| | | |
|---|---|---|
| CN | 104812535 A | 7/2015 |
| CN | 105072580 A | 11/2015 |
| CN | 103948354 B | 3/2016 |
| CN | 205353759 U | 6/2016 |
| CN | 105978078 A | 9/2016 |
| CN | 106774295 A | 5/2017 |
| CN | 106826821 A | 6/2017 |
| CN | 108061886 A | 5/2018 |
| CN | 108227705 A | 6/2018 |
| CN | 108879882 A | 11/2018 |
| CN | 109298716 A | 2/2019 |
| CN | 109347165 A | 2/2019 |
| CN | 109501886 A | 3/2019 |
| CN | 109933073 A | 6/2019 |
| GB | 9911397 | 7/1999 |
| JP | 863155305 A | 6/1988 |
| JP | 2003001577 A | 1/2003 |
| WO | 2018199829 A1 | 11/2018 |
| WO | 2019019578 A1 | 1/2019 |

* cited by examiner

| 0 | 0 | 0 | 0 | 0 | 1 | 1 | 1 | 1 | C | C | 1 | 1 | 1 | 1 | 0 | 0 | 0 | 0 |
|---|---|---|---|---|---|---|---|---|---|---|---|---|---|---|---|---|---|---|
| 0 | 0 | 0 | 0 | 0 | 1 | 1 | 1 | 1 | 9 | 9 | D | 1 | 1 | 1 | 1 | 0 | 0 | 0 |
| 0 | 0 | 0 | 0 | 0 | 1 | 1 | 3 | 3 | 9 | 9 | D | 5 | 1 | 1 | 1 | 0 | 0 | 0 |
| 0 | 0 | 0 | 0 | 0 | 1 | 1 | 3 | B | 9 | 9 | D | 5 | 5 | 1 | 0 | 0 | 0 | 0 |
| 0 | 0 | 0 | 0 | 0 | 0 | 3 | 3 | 3 | 9 | 9 | C | 5 | 4 | 0 | 0 | 0 | 0 | 0 |
| 0 | 0 | 0 | 0 | 0 | 0 | 2 | 2 | 3 | 8 | 8 | 4 | 4 | 4 | 0 | 0 | 0 | 0 | 0 |
| 0 | 0 | 0 | 0 | 0 | 0 | 2 | 2 | A | 8 | 8 | C | 4 | 4 | 4 | 0 | 0 | 0 | 0 |
| 0 | 0 | 0 | 0 | 0 | 0 | 2 | 2 | A | 8 | 8 | C | 4 | 4 | 4 | 0 | 0 | 0 | 0 |
| 0 | 0 | 0 | 0 | 0 | 0 | 2 | 2 | A | 8 | 8 | C | 4 | 4 | 4 | 0 | 0 | 0 | 0 |
| 0 | 0 | 0 | 0 | 0 | 2 | 2 | 2 | A | 8 | 8 | C | 4 | 4 | 4 | 0 | 0 | 0 | 0 |
| 0 | 0 | 0 | 0 | 0 | 2 | 2 | 2 | A | 8 | 8 | C | 4 | 4 | 4 | 0 | 0 | 0 | 0 |
| 0 | 0 | 0 | 0 | 0 | 2 | 2 | 2 | A | 8 | 8 | C | 4 | 4 | 4 | 0 | 0 | 0 | 0 |
| 0 | 0 | 0 | 0 | 0 | 2 | 2 | 2 | A | 8 | 8 | C | 4 | 4 | 4 | 0 | 0 | 0 | 0 |
| 0 | 0 | 0 | 0 | 0 | 2 | 2 | 2 | A | 8 | 8 | C | 4 | 4 | 4 | 0 | 0 | 0 | 0 |
| 0 | 0 | 0 | 0 | 2 | 2 | 2 | 2 | A | 8 | 8 | C | 4 | 4 | 4 | 0 | 0 | 0 | 0 |
| 0 | 0 | 0 | 0 | 2 | 2 | 2 | 2 | A | 8 | 8 | C | C | 4 | 4 | 4 | 0 | 0 | 0 |
| 0 | 0 | 0 | 0 | 2 | 2 | 2 | 2 | A | 8 | 8 | C | C | 4 | 4 | 4 | 0 | 0 | 0 |
| 0 | 0 | 0 | 0 | 2 | 2 | 2 | 2 | A | 8 | 8 | C | C | 4 | 4 | 4 | 0 | 0 | 0 |
| 0 | 0 | 0 | 0 | 2 | 2 | 2 | 2 | A | 8 | 8 | C | 4 | 4 | 4 | 0 | 0 | 0 | 0 |
| 0 | 0 | 0 | 0 | 0 | 2 | 2 | 2 | A | 8 | 8 | C | 4 | 4 | 4 | 0 | 0 | 0 | 0 |

AUTOMATIC GENERATION METHOD FOR ROBOT RETURN-TO-BASE CODE

CROSS REFERENCE TO RELATED APPLICATIONS

The present disclosure claims priority of Chinese Patent Application No. 201910255044.1, filed on Apr. 1, 2019, entitled "Automatic generation method for robot return-to-base code", the contents of which are hereby incorporated by reference in its entirety.

TECHNICAL FIELD

The disclosure relates to the field of an intelligent robot, and in particular to an automatic generation method for robot return-to-base code.

BACKGROUND

A sweeping robot is an intelligent household cleaning device, which may supply energy depending on a self-assembled battery so as to realize wireless cleaning work. When electric energy of the battery is reduced and the charging is needed, the robot searches a charging base and automatically returns to the charging base for charging. At present, there are a plurality of charging base designs on the market, some charging bases are equipped with three infrared sensors, while other charging bases are equipped with four or more infrared sensors. These infrared sensors are configured to emit infrared signals to guide the robot to return to the base for charging. The infrared sensors are arranged at different positions in the charging base, formed signal distribution situations are also different, and manners for guiding the robot return to the base for charging are also different. Aiming at different return-to-base solutions of the charging bases, the research and development personnel need to invest a lot of time and energy to develop and debug, so that the research and development efficiency is low.

SUMMARY

The disclosure provides an automatic generation method for a robot return-to-base code. The specific technical solutions of the disclosure are as follows.

An automatic generation method for a robot return-to-base code includes the following that: on the basis of a preset signal collection mode, a robot collects a guide signal which is sent by a charging base and distributed within a preset range; the robot sends signal information and azimuth information of the robot which are recorded when the guide signal is collected to a data processing device; and the data processing device generates the robot return-to-base code corresponding to the charging base according to the signal information and the azimuth information which are received.

Further, the preset signal collection mode includes: a traversal collection mode, a national standard position collection mode and a middle signal region collection mode.

Further, the step that on the basis of a preset signal collection mode, a robot collects a guide signal which is sent by a charging base and distributed within a preset range specifically includes the following that: starting from a position of the charging base, the robot traverses the preset range in front of the charging base in the form of a ョ-shaped track, in the traversal process, a signal receiving device of the robot collects, in real time, the guide signal sent by the charging base, and meanwhile, the robot further records signal information and azimuth information of the robot when the guide signal is collected.

Furthermore, when the traversal is performed in the form of the ョ-shaped track, the linear distance between long sides of the adjacent ョ-shaped tracks is the body width of the robot; and when the robot performs repeated traversal, the long sides of the ョ-shaped tracks walked by the repeated traversal are parallel and are located between two adjacent long sides of the previously walked ョ-shaped track.

Further, the step that in the national standard position collection mode, the robot collects a guide signal which is sent by a charging base and distributed within a preset range specifically includes the following that: the robot determines a point corresponding to a national standard position in front of the charging base, then successively walks to each national standard position, and rotates at each national standard position, in the rotation process, the signal receiving device of the robot collects, in real time, the guide signal sent by the charging base, and meanwhile, the robot further records the signal information and the azimuth information of the robot when the guide signal is collected.

Further, the step that on the basis of the middle signal region collection mode, the robot collects a guide signal which is sent by a charging base and distributed within a preset range specifically includes the following that: the robot traverses a preset region in front of the charging base by taking the front of the charging base as an extension direction of the ョ-shaped track, in the traversal process, the signal receiving device of the robot collects, in real time, the guide signal sent by the charging base, and meanwhile, the robot further records the signal information and the azimuth information of the robot when the guide signal is collected. The preset region is a rectangular region and is bilaterally symmetrical by taking the front of the charging base as a center line, and the preset region covers the guide signal which is sent by a middle signal emitter of the charging base and located within the preset range.

Further, the step that the robot sends signal information and azimuth information of the robot which are recorded when the guide signal is collected to a data processing device specifically includes the following: the robot sends a device code of the current signal receiving device and a signal code of the guide signal received by the robot to the data processing device; and the robot sends a current position coordinate and angle parameter to the data processing device.

Further, the step that the data processing device generates the robot return-to-base code corresponding to the charging base according to the signal information and the azimuth information which are received specifically includes the following that: the data processing device performs information graphical processing according to the signal information and the azimuth information recorded by the robot in the traversal collection mode so as to obtain a first signal distribution map, and extracts first signal probability distribution data; the data processing device performs probability statistics according to the signal information and the azimuth information recorded by the robot in the national standard position collection mode so as to obtain a signal receiving probability, signal receiving interval time and a signal receiving direction at each national standard position; the data processing device performs the information graphical processing according to the signal information and the azimuth information recorded by the robot in the middle signal region mode so as to obtain a second signal distribution map, and extracts second signal probability distribution data; and the data processing device performs return-to-base flow information configuration on the first signal probability distribution data, the second signal probability distribution data, the signal receiving probability, the signal receiving interval time and the signal receiving direction so as to generate the robot return-to-base code corresponding to the charging base.

Further, the step that the data processing device performs return-to-base flow information configuration on the first signal probability distribution data, the second signal probability distribution data, the signal receiving probability, the signal receiving interval time and the signal receiving direction so as to generate the robot return-to-base code corresponding to the charging base specifically includes the following that: the data processing device receives an infrared code value of the charging base and configuration information of the robot; the data processing device imports the first signal probability distribution data, the second signal probability distribution data, the signal receiving probability, the signal receiving interval time and the signal receiving direction; and the data processing device replaces corresponding data in a return-to-base code template with the infrared code value, the configuration information, the first signal probability distribution data, the second signal probability distribution data, the signal receiving probability, the signal receiving interval time and the signal receiving direction, and generates a new robot return-to-base code corresponding to the charging base.

DETAILED DESCRIPTION OF THE EMBODIMENTS

The technical solutions in the embodiments of the disclosure will be described below in detail with reference to the accompanying drawings in the embodiments of the disclosure. It will be appreciated that the specific embodiments described below are only intended to explain the disclosure and not intended to limit the disclosure. In the following description, specific details are provided in order to provide a thorough understanding of the embodiments. However, it will be understood by those of ordinary skill in the art that the embodiments can be practiced without these specific details. For example, circuits can be shown in block diagrams in order to avoid obscuring the embodiments in unnecessary details. In other cases, well-known circuits, structures, and techniques can not be shown in detail in order not to obscure the embodiments.

An automatic generation method for a robot return-to-base code is provided. The robot can be an autonomous mobile robot, for example, a cleaning robot, an air purification robot, a security protection robot, an early education robot and the like. The return-to-base code is a program which is embedded in a robot control system and is used for controlling the robot to automatically return to a base for charging. At present, the return-to-base code of the robot is a corresponding program code written by research and development personnel according to different charging base types, so that the research and development efficiency is very low.

Figure 1:
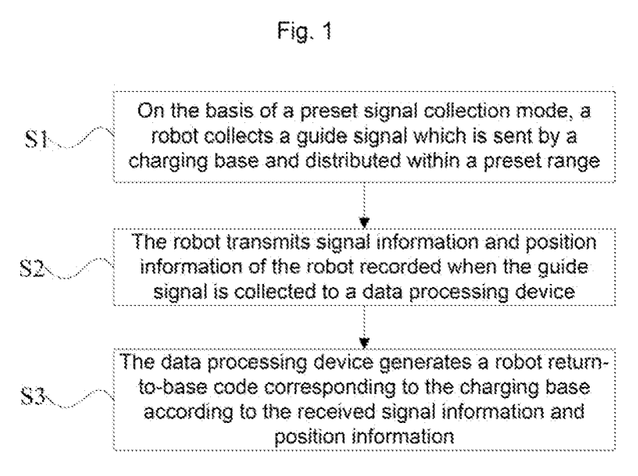
FIG. 1 is a flow chart of an automatic generation method for a robot return-to-base code according to an embodiment of the present disclosure.

As shown in FIG. 1, the automatic generation method for a robot return-to-base code includes the following.

Figure 2:
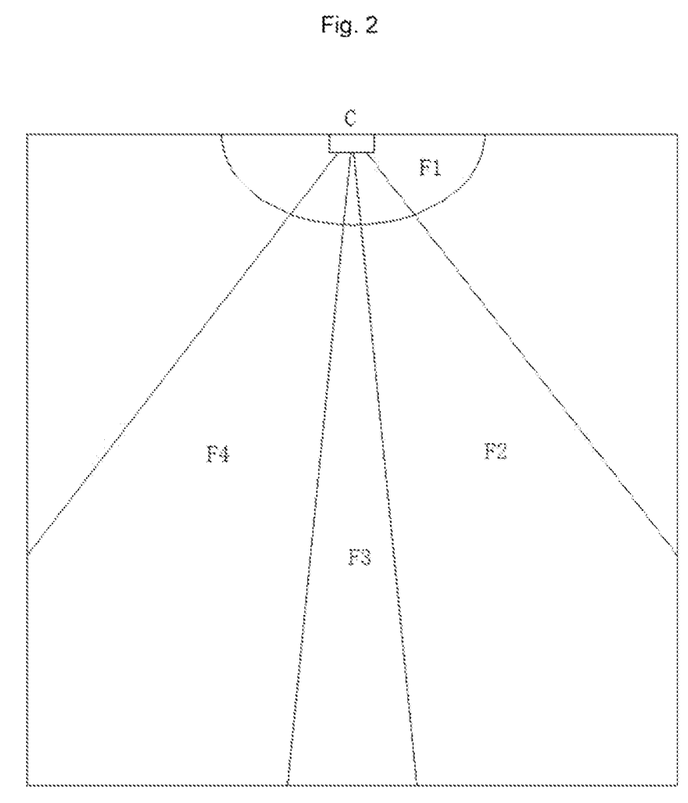
FIG. 2 is a signal distribution diagram of the charging base according to an embodiment of the present disclosure.

S1, on the basis of a preset signal collection mode, a robot collects a guide signal which is sent by the charging base and distributed within a preset range. The preset collection mode can be correspondingly selected and set according to different design requirements, a traversal collection mode, a national standard position collection mode and/or a middle signal region collection mode can be adopted according to a common structure type of the current charging base, and of course, other collection modes (for example, a guardrail signal collection mode, a boundary signal collection mode and the like) can further be added. According to these collection modes, the robot can comprehensively and effectively collect the guide signal which is sent by the charging base and distributed within a preset range. A guide device in the charging base is an infrared sensor, and the sent guide signal is an infrared signal. The region covered by the guide signal can be divided into a guardrail signal region, a middle signal region, a left signal region and a right signal region. As shown in FIG. 2, in a region covered by the infrared signal of the charging base C, a range enclosed by an arc line and a horizontal straight line is the guardrail signal region F1, the range enclosed by a triangle in the middle is the middle signal region F3, the range enclosed by two leftmost oblique lines and an outer boundary is the left signal region F4, and the range enclosed by two rightmost oblique lines and the outer boundary is the right signal region F2. The preset range can be correspondingly set according to a specific design requirement, for example, a rectangular range (for example, 2*2 m, 3*3 m or 2*3 m, and the like) can be set, and as shown in FIG. 2, the region enclosed by the outermost square boundary is the defined preset range of 2*2 m.

Figure 3:
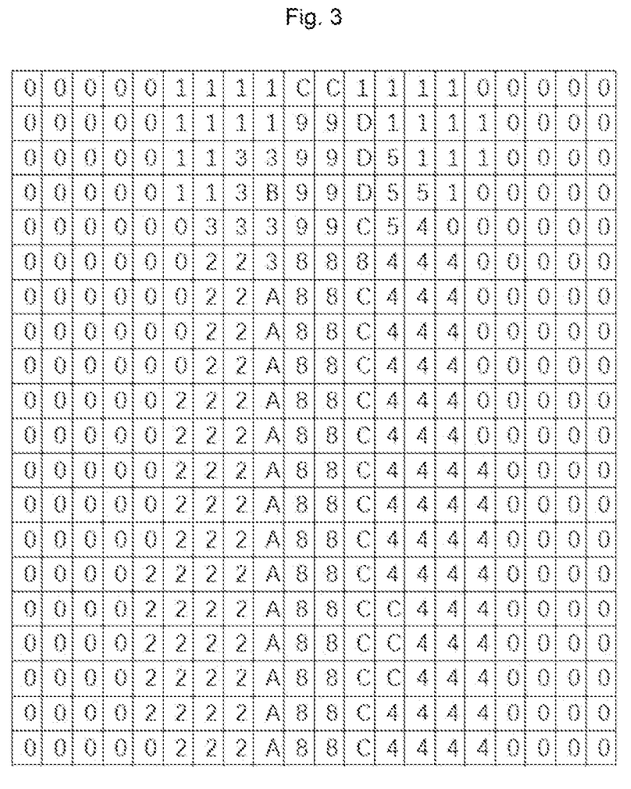
FIG. 3 is a signal code distribution diagram of the charging base within a preset range according to an embodiment of the present disclosure.

S2, the robot transmits signal information and position information of the robot which are recorded when the guide signal is collected to the data processing device. The signal information includes a device code of a signal receiving device (that is, an infrared signal receiving sensor) in the robot, and a signal code of a guide signal received by the signal receiving device. The device code is a code of a sensor which is arranged on a robot body and is used for receiving an infrared signal. The infrared signal receiving sensors of the robot in the embodiment are respectively arranged in front of, in left front of, in right front of, in left rear of and in right rear of the robot, each sensor can be provided with a code, and a code value can be freely set, only if the robot can recognize which sensor receives the signal. The azimuth information of the robot includes a position coordinate and a direction angle of the robot. The data processing device can be an apparatus with data processing capability (for example, electronic products such as a computer or a smart phone and the like) and can also be a processor built in an intelligent robot and the like. As shown in FIG. 3, the figure is a signal code distribution diagram of a guide signal within a preset range, called an IR map for short. In the figure, signal distribution of 4 square meters (2 m*2 m) in front of the charging base is represented by using a grid group of 20*20, each signal is represented as a bit, for example, a guardrail signal is represented by using a bit with the lowest byte, a left signal is represented by using a second bit, a right signal is represented by using a third bit and a middle signal is represented by using a fourth bit. When a signal code received by the robot is 0x0D, it represents that the robot can simultaneously receive the guardrail signal, the right signal and the middle signal at this position, that is, a position corresponding to a grid cell numbered D in the figure. Usage of this representation method is the premise of guessing the base by means of a statistical method subsequently, and a change in the signal is also encapsulated, so that a subsequent algorithm can be compatible with many different signal distributions. In the shown IR map, the position of the charging base is in the middle of a first row, that is, a position labeled C. The accuracy of the IR map is 10 cm, and in this way, the signal distribution of 400 grid cells in a region of 2 m*2 m can be recorded. For example, B in a fourth row is at a position 20 cm in front of the charging base and 10 cm on the left side, a value of the signal code is B, which is converted to a binary value of 1011, that is, the signal received by the robot at this position contains the guardrail signal, the left signal and the middle signal. In the figure, code 0 indicates that the robot does not receive any guide signal. Code 1 represents that the robot receives the guardrail signal at the position. Code 2 represents that the robot receives the left signal at the position. Code 3 represents that the robot receives both the left signal and the guardrail signal at the position. Code 4 represents that the robot receives the right signal at the position. Code 5 represents that the robot receives both the right signal and the guardrail signal at the position. The meanings of the other code signals are analogized in turn and will not be described in detail.

S3, the data processing device performs analysis processing on related information according to the signal information and the azimuth information which are received, substitutes the analyzed data into a preset return-to-base template, replaces the corresponding data in the template, and finally generates the robot return-to-base code corresponding to the current charging base.

According to the embodiment, the research and development personnel do not need to delve into a robot return-to-base algorithm or write a specific return-to-base code. Only the data collected by the robot in a certain signal collection mode needs to be sent to the data processing device, and the return-to-base code corresponding to the charging base can be directly generated by the data processing device. The robot return-to-base code generated by the data processing device can be directly embedded into a robot system, so that the robot can realize an automatic return-to-base code function, and the research and development efficiency of a robot return-to-base technology is greatly improved. In addition, in such a manner, the robot can be quickly applicable to different types of charging bases, so that the universality of the robot is improved.

As one of the embodiments, the preset signal collection mode includes: a traversal collection mode, a national standard position collection mode and a middle signal region collection mode. The traversal collection mode refers to a control mode that the robot traverses the preset range in front of the charging base and collects the received signal in real time in the traversal process. The national standard position collection mode refers to the control mode that the robot rotates at a specific position point defined in a national standard test and collects the received signal in real time in the rotation process. The middle signal region collection module refers to the control mode that the robot traverses in a middle signal region and collects the received signal in real time in the traversal process. According to the embodiment, the robot is controlled to respectively perform signal collection in the three collection modes, so that the signal distribution situation of the current charging base can be comprehensively acquired, and more accurate reference data can be provided for the subsequent generation of the return-to-base code.

Figure 4:
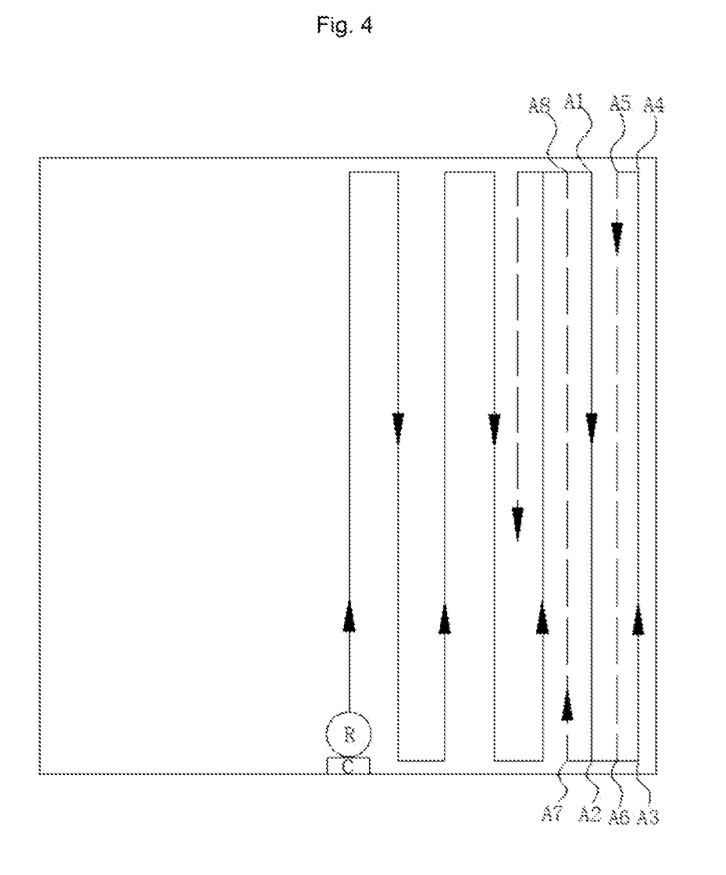
FIG. 4 is a walking path analysis diagram of the robot in a traversal signal collection mode according to an embodiment of the present disclosure.

Specifically, as shown in FIG. 4, a range delineated by the outermost square frame is the preset range, a small rectangular line frame represents the charging base C, a circular line frame represents the robot R, and a ㋹-shaped line with an arrow represents a walking path of the robot. the step that on the basis of a preset signal collection mode, a robot collects a guide signal which is sent by a charging base and distributed within a preset range specifically includes the following that: starting from the position of the charging base C, the robot R goes straight ahead, and walks along a solid line with the arrow and a direction indicated by the arrow in the form of a ㋹-shaped track. On the shown ㋹-shaped path, the distance between two adjacent vertical solid lines is the body width of the robot, for example, the distance between a straight line A1A2 and the straight line A3A4 is equal to the body width of the robot R, so that the traversal speed of the robot can be improved. Of course, this distance can also be smaller than the body width of the robot, and a specific value can be set according to a design requirement. By reducing this distance, the tightness of the walking of the robot can be improved, thereby improving the accuracy of the received signal, but the traversal speed can be relatively reduced. When the robot walks from the A3 to the A4, the traversal of the region on the right side of the charging base is completed. Then, the robot turns at the point A4, walks from the point A5 towards the point A6 along a route described by a dotted line, continues to walk in the form of the ㋹-shaped track, and successively passes through the positions, for example, the point A7, the point A8 and the like. The subsequent walking route is omitted and is not marked in the figure. When the robot walks to the left-most boundary of the preset range, the robot has completed the traversal of the whole preset range at the moment. In order to further improve the accuracy of signal collection, the robot can continue to turn and continue to perform ㋹-shaped walking within the preset range from left to right in a similar manner, so that the preset range is traversed again. The number of traversals can be selected according to the specific design requirement, and there are 2 to 3 traversals in general. In the traversal process, the signal receiving device of the robot collects, in real time, the guide signal sent by the charging base, and meanwhile, the robot further records signal information and azimuth information of the robot when the guide signal is collected. According to the embodiment, the robot traverses the preset range in front of the charging base, so that the signal distribution situation of the charging base within the preset range can be accurately acquired, and accurate reference data can be provided for the subsequent generation of the return-to-base code.

In addition, the robot can go straight left or right from the position of the charging base to the boundary of the preset range first, and then performs the arched-shaped traversal starting from the boundary. The robot can also start from the position of the charging base. After traversing the region on one side of the charging base, the robot directly returns to the position of the charging base, and then traverses the other side of the charging base. What manner is adopted specifically can be set based on the design requirement.

Further, when the traversal is performed in the form of the ᄅ-shaped track, the straight-line distance between long sides of two adjacent ᄅ-shaped tracks is the body width of the robot. The distance is set in such a way that the repeatability of the single traversal of the robot can be reduced, and the traversal efficiency can be improved. When the robot performs repeated traversal, the long sides of the ᄅ-shaped tracks walked by the repeated traversal are parallel and are located between the two adjacent long sides of the previously walked ᄅ-shaped track, that is, in FIG. 4, a dotted line with an arrow is arranged between two adjacent solid lines with the arrows, and the dotted line is parallel to the solid lines and located between two adjacent solid lines. According to the embodiment, by means of the repeatedly staggered ᄅ-shaped walking tracks, the accuracy of the acquired data can be improved, and the accurate reference data can be further provided for the subsequent generation of the return-to-base code.

Figure 5:
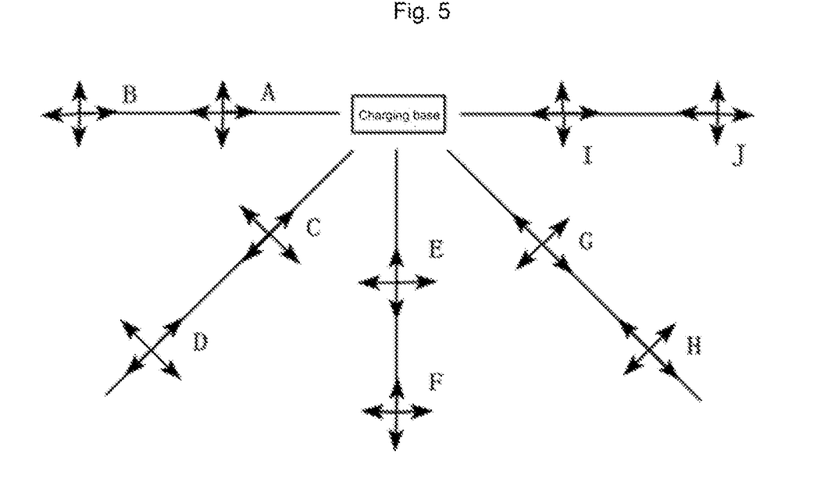
FIG. 5 is a signal collection diagram of the robot in a national standard position collection mode according to an embodiment of the present disclosure.

Specifically, the step that in the national standard position collection mode, the robot collects a guide signal which is sent by a charging base and distributed within a preset range specifically includes the following that: firstly, the robot determines a point corresponding to a national standard position in front of the charging base, the positions of these points are established in a national standard and are respectively a point A, a point B, a point C, a point D, a point E, a point F, a point G, a point H, a point I and a point J shown in FIG. 5. Then the robot successively walks to each national standard position, and rotates at each national standard position. The number of rotations can be set according to the design requirement and can be generally set to be 2 turns or 3 turns. In the rotation process, the signal receiving device of the robot collects, in real time, the guide signal sent by the charging base, and focuses on collecting the signal received by the robot when the robot rotates to a direction described by an arrow of each position point in FIG. 5, and meanwhile, the robot further records signal information and azimuth information of the robot when the guide signal is collected. According to the embodiment, the robot performs signal collection at each national standard position, so that accurate reference data can be provided for the robot in a subsequent national standard test, the quality of a product is ensured, and the performance of the product is ensured to meet the national standard.

In addition to the above embodiments, the robot can be manually placed at the corresponding national standard position point respectively, and then the robot rotates to collect the signal. What manner is adopted specifically can be set based on the design requirement.

Figure 6:
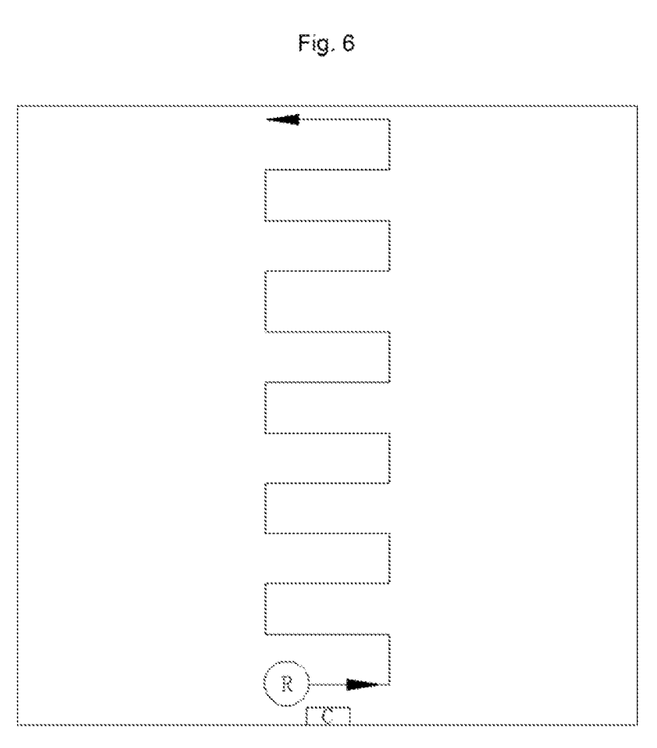
FIG. 6 is a walking path analysis diagram of the robot in a middle signal region collection mode according to an embodiment of the present disclosure.

Specifically, as shown in FIG. 6, a range delineated by the outermost square frame is the preset range, a small rectangle at the bottom of the square frame represents the charging base C, a circle represents the robot R, and the ᄅ-shaped track with the arrow represents a walking path of the robot. The step that on the basis of the middle signal region collection mode, the robot collects a guide signal which is sent by a charging base and distributed within a preset range specifically includes the following that: firstly, the robot R goes straight from the left front side of the charging base C to the right front side of the charging base C, and of course, the robot R can also go straight from the right front side of the charging base C to the left front side of the charging base C, so that the robot R can be prevented from directly performing ᄅ-shaped sweeping from the middle position of the charging base C so as to omit a small position on the left front side or the right front side of the charging base C. Then, the robot traverses the preset region in front of the charging base by taking the front of the charging base as an extension direction of the ᄅ-shaped track, that is, the robot performs ᄅ-shaped walking from the bottom of the preset range towards the top direction, the traversal distance in the left and right direction can cover the width of the middle guide signal sent by the charging base C, and when the robot walks to the boundary of the top of the preset range, the traversal of the middle signal region is completed. In the traversal process, the signal receiving device of the robot collects, in real time, the guide signal sent by the charging base, and meanwhile, the robot further records signal information and azimuth information of the robot when the guide signal is collected. The preset region is a rectangular region and is bilaterally symmetrical by taking the front of the charging base as a center line, and the preset region covers the guide signal which is sent by a middle signal emitter (that is, an infrared signal emission sensor) of the charging base and located within the preset range, for example, the region covered by the ᄅ-shaped track in FIG. 6. According to the embodiment, the robot performs the signal collection in the middle signal region of the charging base, so that the accurate reference data can be provided for the robot when the robot subsequently returns to the base along with a middle signal, the accuracy of return-to-base code generation is improved, and the robot is ensured to return to the base accurately.

As one of the embodiments, the step that the robot sends signal information and azimuth information of the robot which are recorded when the guide signal is collected to a data processing device specifically includes the following that: firstly, the robot sends a device code of the current signal receiving device and a signal code of the guide signal received by the robot to the data processing device. The device code is a code value compiled by a designer according to the number of infrared receiving sensors arranged in the robot and mounting positions, and by means of the code value, a specific sensor in the robot is distinguished and determined. The signal code value is a code value compiled by the designer according to the number of infrared emission sensors in the charging base and mounting positions, and by means of the code value, which sensor the guide signal received by the robot comes from can be known. The data can be determined at the completion of the design of the robot or charging base and stored in the robot system. When the robot needs to re-match a new charging base, the data can be re-sent to the data processing device. In addition, the robot further sends a current position coordinate and angle parameter to the data processing device. The position coordinate and the angle parameter are obtained by calculating through a processor of the robot on the basis of distance data detected by an odometer in a drive wheel and angle data detected by a gyroscope in the body in the motion process of the robot, and by means of the data, the robot can accurately know a current position and azimuth of the robot. According to the embodiment, the robot sends the collected information and configuration information of the robot to the data processing device, so that the accurate and valid reference data is provided for the data processing device to subsequently generate the return-to-base code, and the validity of the return-to-base code generation is ensured.

As one of the embodiments, the step that the data processing device generates the robot return-to-base code corresponding to the charging base according to the signal information and the azimuth information which are received specifically includes the following that: firstly, the data processing device performs image processing by adopting OPENCV according to the signal information and the azimuth information recorded by the robot in the traversal collection mode, the data of each traversal can be drawn into an image, the images are superposed and optimized to obtain a first signal distribution map, and the first signal probability distribution data is extracted. Then, the data processing device performs probability statistics according to the signal information and azimuth information recorded by the robot in the national standard position collection mode, calculates a probability of receiving different guide signals at each position point, and extracts data, for example, the signal receiving probability, the signal receiving interval time and the signal receiving direction at each national standard position. Of course, the related data can also be displayed in a graphic form. Then, the data processing device performs image processing by adopting OPENCV according to the signal information and azimuth information recorded by the robot in the middle signal region mode, performs image optimization in manners of solving an envelope straight line and the like so as to obtain a second signal distribution map, and extracts second signal probability distribution data. Finally, the data processing device performs return-to-base flow information configuration on the first signal probability distribution data, the second signal probability distribution data, the signal receiving probability, the signal receiving interval time and the signal receiving direction so as to generate the robot return-to-base code corresponding to the charging base. According to the embodiment, by means of graphical processing and probability statistics of the information, the accuracy of the collected data can be improved, and by means of the generated return-to-base code, the robot return-to-base efficiency is relatively high.

As one of the embodiments, the step that the data processing device performs return-to-base flow information configuration on the first signal probability distribution data, the second signal probability distribution data, the signal receiving probability, the signal receiving interval time and the signal receiving direction so as to generate the robot return-to-base code corresponding to the charging base specifically includes the following that: the data processing device receives an infrared code value of the charging base and configuration information of the robot. The information can be input manually or can also be directly output through a memory in the robot. Then, the data processing device imports the first signal probability distribution data, the second signal probability distribution data, the signal receiving probability, the signal receiving interval time and the signal receiving direction. Finally, the data processing device replaces corresponding data in a return-to-base code template with the data (for example, the infrared code value, the configuration information, the first signal probability distribution data, the second signal probability distribution data, the signal receiving probability, the signal receiving interval time and the signal receiving direction), and generates a new robot return-to-base code corresponding to the charging base. According to the embodiment, related configuration parameters of the charging base and the robot and the related signal parameter obtained by the robot in the signal collection mode are substituted into the original return-to-base code template so as to replace the original related data, so that the new return-to-base code corresponding to the charging base to be matched can be generated. The whole process is convenient to operate, only the related data needs to be input, and no program code needs to be written, so that the generation efficiency of the robot return-to-base code is greatly improved.

The direction words "up", "down", "left" and "right" in the above embodiments, if not specifically stated, refer to the directions up, down, left, right, and the like in the drawings. If specifically stated, they are defined as specifically stated, for example, the left side of the robot refers to the left side in a forward direction of the robot and not to the left side in the drawings.

The front of the charging base mentioned in the above embodiments refers to a direction in which one side of the charging base butted with the robot faces, and the side surface is provided with an infrared sensor for guiding the robot to return to the base. One side in front of the charging base can be the left side of the charging base or the right side of the charging base, the charging base can be specifically arranged according to a product design requirement, if one side in front of the charging base is arranged to be the left side, the other side is the right side of the charging base, and if one side in front of the charging base is arranged to be the right side, the other side is the left side of the charging base.

It is apparent that the above embodiments are only a part of the embodiments of the present disclosure, and not all the embodiments, and that the technical solutions between the embodiments can be combined with each other. All or part of the steps for implementing the above embodiments can be performed by means of program instruction related hardware. These programs can be stored in a computer-readable storage medium, for example, various media, such as a ROM, a RAM, a magnetic or optical disk on which a program code can be stored. The program, when executed, performs steps of the above method embodiments. Finally, it is to be noted that: the above embodiments are only intended to illustrate the technical solutions of the present disclosure and are not intended to limit the technical solutions of the present disclosure. Although the present disclosure has been described in detail with reference to the foregoing embodiments, those skilled in the art will appreciate that: the technical solutions of the above embodiments can still be modified, or some or all of the technical features thereof can be equivalently substituted; however, through these modifications and substitutions, the essence of the corresponding technical solutions do not depart from the scope of the embodiments of the disclosure.

What is claimed is:

1. An automatic generation method for a robot return-to-base code, comprising the following:
   on basis of a preset signal collection mode, collecting, by the robot, a guide signal which is sent by a charging base and distributed within a preset range;
   sending, by the robot, signal information and azimuth information of the robot, which are recorded when the guide signal is collected, to a data processing device; and
   generating, by the data processing device, the robot return-to-base code corresponding to the charging base according to the signal information and the azimuth information which are received, the return-to-base code is a program which is embedded in a robot control system and is used for controlling the robot to automatically return to the base for charging,
   wherein the preset signal collection mode comprises: a traversal collection mode, a national standard position collection mode and a middle signal region collection mode, wherein on the basis of the preset signal collection mode, collecting, by the robot, the guide signal which is sent by the charging base and distributed within the preset range specifically comprises the following: starting from a position of the charging base, traversing, by the robot, the preset range in front of the charging base in a form of a snake shaped track, during traversal process, collecting, by a signal receiving device of the robot, in real time, the guide signal sent by the charging base, and meanwhile, further recording, by the robot, the signal information and the azimuth information of the robot when the guide signal is collected, wherein generating, by the data processing device, the robot return-to-base code corresponding to the charging base according to the signal information and the azimuth information which are received specifically comprises the following:

performing, by the data processing device, information graphical processing according to the signal information and the azimuth information recorded by the robot in the traversal collection mode so as to obtain a first signal distribution map, and extracting first signal probability distribution data;

performing, by the data processing device, probability statistics according to the signal information and the azimuth information recorded by the robot in the national standard position collection mode so as to obtain a signal receiving probability, signal receiving interval time and a signal receiving direction at each national standard position;

performing, by the data processing device, the information graphical processing according to the signal information and the azimuth information recorded by the robot in the middle signal region mode so as to obtain a second signal distribution map, and extracting second signal probability distribution data; and performing, by the data processing device, return-to-base flow information configuration on the first signal probability distribution data, the second signal probability distribution data, the signal receiving probability, the signal receiving interval time and the signal receiving direction so as to generate the robot return-to-base code corresponding to the charging base.

2. The automatic generation method according to claim 1, wherein when traversal is performed in the form of the snake shaped track, a linear distance between long sides of two adjacent snake shaped tracks is a robot width of the robot; and when the robot performs repeated traversal, long sides of the snake shaped tracks traveled by the repeated traversal are parallel and are located between two adjacent long sides of the previously traveled snake shaped track.

3. The automatic generation method according to claim 2, wherein sending, by the robot, the signal information and the azimuth information of the robot, which are recorded when the guide signal is collected, to the data processing device specifically comprises the following:

sending, by the robot, a device code of the signal receiving device and a signal code of the guide signal received by the robot to the data processing device; and sending, by the robot, a current position coordinate and angle parameter to the data processing device.

4. The automatic generation method according to claim 1, wherein in the national standard position collection mode, collecting, by the robot, the guide signal which is sent by a charging base and distributed within the preset range specifically comprises the following:

determining, by the robot, points corresponding to national standard positions in front of the charging base, then successively traveling to each national standard position, and performing rotation at each national standard position, during a rotation process, collecting, by the signal receiving device of the robot, in real time, the guide signal sent by the charging base, and meanwhile, further recording, by the robot, the signal information and the azimuth information of the robot when the guide signal is collected.

5. The automatic generation method according to claim 4, wherein sending, by the robot, the signal information and the azimuth information of the robot, which are recorded when the guide signal is collected, to the data processing device specifically comprises the following:

sending, by the robot, a device code of the signal receiving device and a signal code of the guide signal received by the robot to the data processing device; and sending, by the robot, a current position coordinate and angle parameter to the data processing device.

6. The automatic generation method according to claim 1, wherein on the basis of the middle signal region collection mode, collecting, by the robot, the guide signal which is sent by the charging base and distributed within the preset range specifically comprises the following:

traversing, by the robot, preset region in front of the charging base by taking the front of the charging base as an extension direction of snake shaped track, during the traversal process, collecting, by signal receiving device of the robot, in real time, the guide signal sent by the charging base, and meanwhile, further recording, by the robot, the signal information and the azimuth information of the robot when the guide signal is collected, wherein the preset region is a rectangular region and is bilaterally symmetrical by taking the front of the charging base as a center line, the preset region covering the guide signal which is sent by a middle signal emitter of the charging base and located within the preset range.

7. The automatic generation method according to claim 6, wherein sending, by the robot, the signal information and the azimuth information of the robot, which are recorded when the guide signal is collected, to the data processing device specifically comprises the following:

sending, by the robot, a device code of the signal receiving device and a signal code of the guide signal received by the robot to the data processing device; and sending, by the robot, a current position coordinate and angle parameter to the data processing device.

8. The automatic generation method according to claim 1, wherein sending, by the robot, the signal information and the azimuth information of the robot, which are recorded when the guide signal is collected, to the data processing device specifically comprises the following:

sending, by the robot, a device code of the signal receiving device and a signal code of the guide signal received by the robot to the data processing device; and sending, by the robot, a current position coordinate and angle parameter to the data processing device.

9. The automatic generation method according to claim 1, wherein performing, by the data processing device, return-to-base flow information configuration on the first signal probability distribution data, the second signal probability distribution data, the signal receiving probability, the signal receiving interval time and the signal receiving direction so as to generate the robot return-to-base code corresponding to the charging base specifically comprises the following:

receiving, by the data processing device, an infrared code value of the charging base and configuration information of the robot;

importing, by the data processing device, the first signal probability distribution data, the second signal probability distribution data, the signal receiving probability, the signal receiving interval time and the signal receiving direction; and replacing, by the data processing device, corresponding data in a return-to-base code template with the infrared code value, the configuration information, the first signal probability distribution data, the second signal probability distribution data, the signal receiving probability, the signal receiving interval time and the signal receiving direction, and generating a new robot return-to-base code corresponding to the charging base.

* * * * *